Aug. 14, 1956 G. W. SCHATZMAN 2,758,859
FENDER SHIELD LATCHING MECHANISM
Original Filed Sept. 8, 1947 2 Sheets-Sheet 1
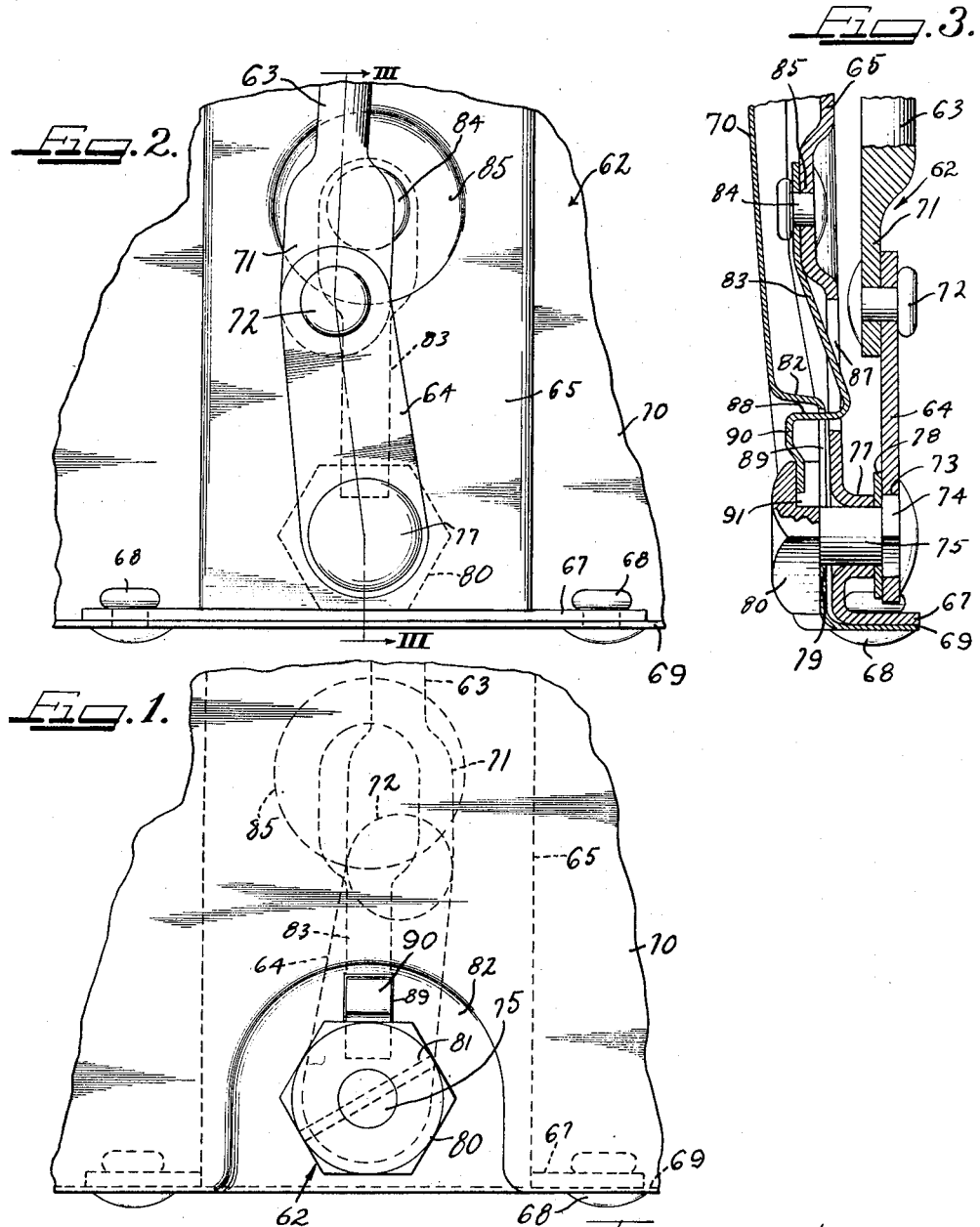
Inventor
GEORGE W. SCHATZMAN.

Aug. 14, 1956  G. W. SCHATZMAN  2,758,859
FENDER SHIELD LATCHING MECHANISM
Original Filed Sept. 8, 1947  2 Sheets-Sheet 2
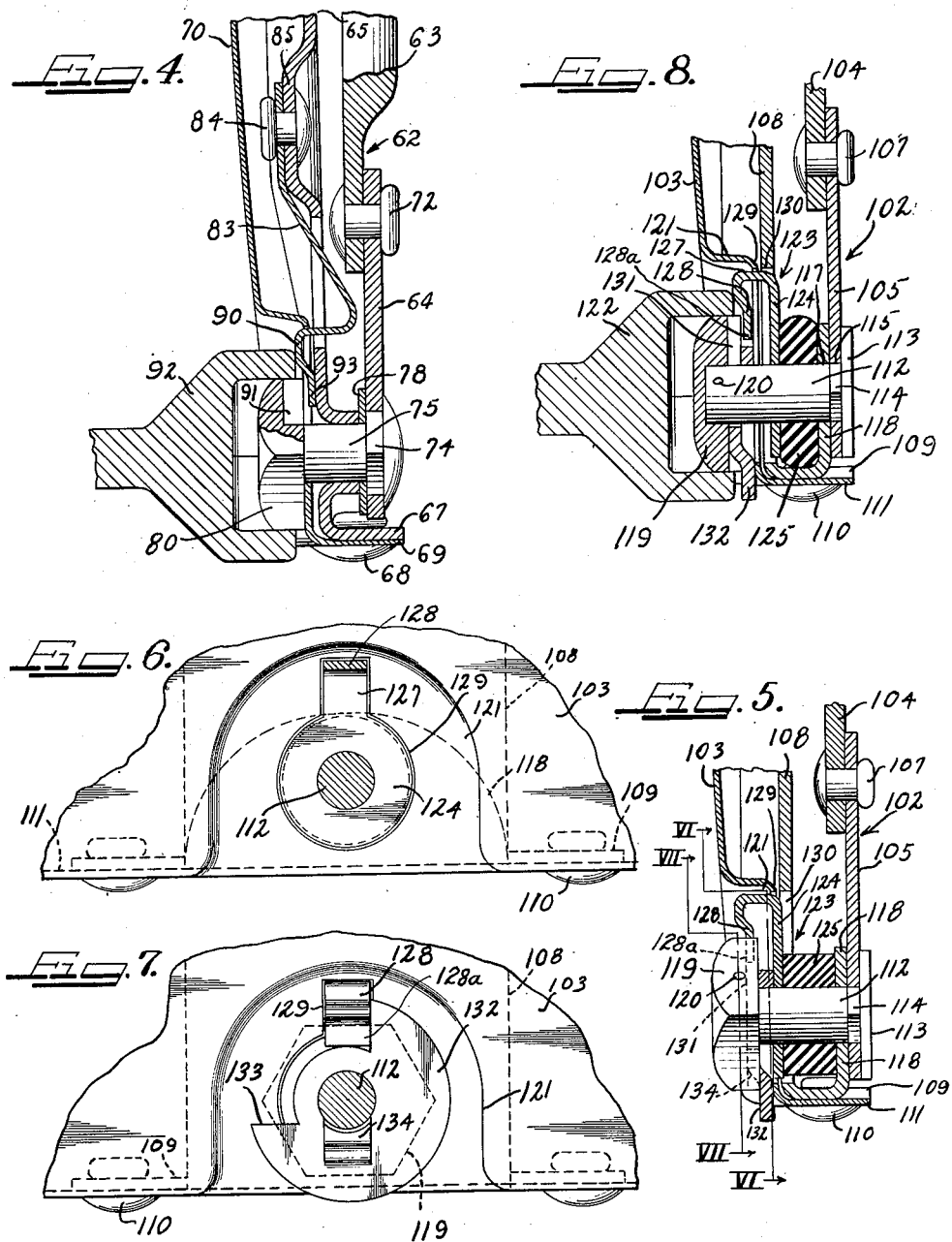
INVENTOR
GEORGE W. SCHATZMAN.

United States Patent Office 2,758,859
Patented Aug. 14, 1956

2,758,859

FENDER SHIELD LATCHING MECHANISM

George W. Schatzman, Detroit, Mich., assignor to Houdaille Industries, Inc., Detroit, Mich., a corporation of Michigan Original application September 8, 1947, Serial No. 772,703, now Patent No. 2,608,427, dated August 26, 1952. Divided and this application January 9, 1952, Serial No. 265,879

7 Claims. (Cl. 292—1)

This invention relates to improvements in fender shields and more particularly concerns novel latching mechanism by which the fender shields are held in place on the fenders with which they are associated.

The present application is a division of my application Serial No. 772,703, filed September 8, 1947, now Patent No. 2,608,427, dated August 26, 1952.

In the vehicle industry, and particularly in the automobile industry, various means have been utilized to improve the appearance of vehicle fenders. The usual vehicle fender is provided with an opening affording access to the vehicle wheel and permitting ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any of the general type of described members which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body, and whether or not it projects outwardly from the principal body portion of the vehicle.

An important object of the present invention is to provide novel means for latching a fender shield in position on a fender.

Another object of the invention is to provide a fender shield having improved latching mechanism.

A further object of the invention is to provide an improved toggle link type fender shield latching mechanism.

Still another object of the invention is to provide improved retaining means for the latching member of a fender shield latching mechanism.

Yet another object of the invention is to provide an improved fender shield latching mechanism which is simple and efficient in operation and involves but a small number of inexpensive, low cost, rugged parts susceptible of economical mass production methods of manufacture and assembly.

Other objects, features and advantages of the present invention will be readily apparent from the following detailed description of certain preferred embodiments thereof taken in conjunction with the accompanying two sheets of drawings, in which:

Figure 1 is a fragmentary outer side elevational view of a fender shield embodying latching mechanism according to the present invention;

Figure 2 is an inside elevational view of the fender shield and latching mechanism shown in Figure 1;

Figure 3 is a vertical sectional detail view taken substantially on the line III—III of Figure 2;

Figure 4 is a vertical sectional view substantially like Figure 3 except that certain parts are shown in slightly different relationship through the application of a manipulating wrench thereto;

Figure 5 is a fragmentary vertical sectional view through a modified form of fender shield and latching mechanism;

Figure 6 is an outside fragmentary elevational view, partially in section, taken substantially on the line VI—VI of Figure 5;

Figure 7 is an outside elevational view similar to Figure 6 but taken substantially on the line VII—VII of Figure 5; and Figure 8 is a vertical sectional detail view similar to Figure 5 but showing the parts in the positions assumed upon the application of a manipulating wrench thereto.

Having reference to Figures 1 through 4, a latching mechanism 62 is depicted which includes a latch rod 63, an operating link 64 and a supporting strut 65. A foot flange 67 on the strut is secured as by rivets 68 to a lower marginal inturned reinforcing flange 69 of a fender shield 70. The latch rod 63 is reciprocably and rockably guided by supporting structure which may be part of or carried by the strut and is formed with a lower flattened bearing finger 71 to which the upper end of the link 64 is pivotally secured as by means of a rivet 72. The lower end of the link 64 is secured by means of a square aperture 73 engaged by a square shoulder 74 of a bolt 75 which is pivotally supported within an annular bearing flange 77 formed in the strut 65, a washer 78 being interposed between the edge of the flange 77 and the link 64 for smoothness in operation.

At its outer end the bolt 75 extends through an aperture 79 in the fender shield 70 and has secured thereto a nut or head 80 formed with wrench faces such as hexagonal faces and maintained in a predetermined position relative to the shank of the bolt 75 by means such as a pin 81. The fender shield is formed about the point of protrusion of the bolt 75 with an inset wrench clearing embossment 82.

In this instance the spring catch and keeper device comprises an elongated leaf spring member 83 which may be formed from a strip of spring metal and which has an upper end portion secured as by means of a rivet 84 to the strut 65 at the outer face thereof, that is, the face which opposes the fender shield 70, the strut being preferably formed with an outward embossment 85 so that the head of the rivet 84 will positively clear the latch rod 63 in the operative movements of the latter. From its attachment to the strut, the spring member 83 extends downwardly and preferably slightly obliquely inwardly through a slot 87 in the strut 65 to a point adjacent the upper edge of the fender shield embossment 82. Thence the lower portion of the member 83 extends right angularly outwardly to provide an arm as indicated at 88 projecting through an aperture extension 89 of the aperture 79, provided in the upper part of the embossment and of a vertical and transverse dimension to afford clearance for a downturned keeper flange portion 90 forming the lower terminal portion of the member 83. The keeper flange 90 is exposed a substantial distance laterally above the head or nut 80 and is of a length to extend downwardly into a keeper slot or notch 91 formed in the inner face of the nut 80 and opening radially through one of the wrench faces thereof, the leaf spring member 83 being normally resiliently biased toward the inner face of the nut 80 to assure entry of the keeper flange 90 into the notch 91 upon registration of the notch with flange 90 in the rotation of the nut. Through this arrangement, the bolt 75 is held against rotation out of the position thereof wherein the link 64 and the latch rod 63 are operatively disposed to maintain the latch rod 63 in full latching position wherein the upper portion of the latch rod, not shown, operatively engages a portion of a fender (not shown) with which the fender shield may be assembled in service.

In order to release the latch rod 63 from latching position, a wrench 92 (Fig. 4) is applied to the nut 80, and the wrench is pushed in against the keeper flange 90 until the latter is yieldably displaced from the keeper slot 91 by flexure of the member 83 until the lower extremity or detent terminal identified at 93 of the keeper flange and which is inset relative to the exposed portion of the keeper flange portion 90, clears the inner face of the nut 80. In the present instance the extremity 93 engages against the adjacent face of the strut 65 so as to avoid stressing the spring member 83 beyond a desirable point and particularly beyond the point where it will safely clear the link 64 and the latch rod assembly in the swinging movements thereof. When the keeper flange 90 has been thus cleared, the wrench may be turned to unlatch the latch rod. When the wrench 92 is removed from the nut 80, the offset terminal portion 93 of the keeper flange engages the inner face of the bolt 80.

When the latching mechanism 62 is to be returned to latching condition, turning of the bolt 75 through the medium of the nut 80 in a reverse direction returns the latch rod 63 to its latching position, and when the keeper notch 91 registers with the keeper flange 90, the latter snaps into the notch and acts to hold the assembly against unintentional displacement from the operative latching condition thereof.

In the modified form of the invention shown in Figs. 5 to 8, inclusive, a latching mechanism 102 is associated with a fender shield 103, including a latch rod 104 and an operating link 105 pivotally secured thereto as by means of a rivet 107. The latch rod and link assembly 104, 105 is of substantially the same construction and operational characteristics as the corresponding structure in the latching mechanism 62 already described. A strut 108 provides support for the latching mechanism and has a foot flange 109 which is secured as by means of rivets 110 to a lower inturned marginal reinforcing flange 111 on the fender shield. Pivotally supporting the link 105 is a bolt 112 which has a head 113 and an immediately adjacent square shoulder 114 fitting in a square hole 115 in the lower portion of the link 105. The shank of the bolt 112 extends pivotally through an appropriate aperture 117 provided in an inner upturned flange 118 on the foot flange 109. At its outer end the bolt 112 has attached thereto a nut 119 which may be secured fast by means of a transverse pin 120. An inset embossment 121 in the lower portion of the fender shield affords clearance for a wrench 122 (Fig. 8) which is adapted to engage the nut 119 for turning the same to actuate the latching mechanism 102.

For retaining the latching mechanism 102 in the latching condition thereof, a yieldable catch and keeper device 123 is provided. This comprises a catch member 124 which is normally biased into operative position by resilient means such as a rubber or rubber-like block of material 125 serving as a biasing spring. The keeper member 124 preferably comprises an annular disk which is assembled concentric with the shaft of the bolt 112. The rubber spring 125 comprises a bushing concentric about the shaft of the bolt and is disposed between the inner face of the keeper disk 124 and the outer adjacent opposing face of the supporting flange 118. Projecting radially upwardly from the edge of the keeper disk 124 and integral therewith is a looped keeper flange 127 which has a terminal portion extending downwardly to provide a keeper flange finger or arm 128. The fender shield 103 within the embossment 121 and the strut 108 are formed with respective registering apertures 129 and 130, respectively, at least the aperture 129 being of generally key-hole shape conforming to and amply clearing the keeper member 124 and cooperating in the narrowest portion thereof with the keeper flange 127 to hold the keeper member 124 against rotation relative to the bolt 112.

The keeper flange arm 128 is provided with an inset detent terminal extremity 128a arranged to engage retainingly within a keeper groove 131 formed diametrically in the inner face of the bolt 119. Thus, under the influence of the rubber spring 125, the catch member 124 is urged outwardly along the bolt 112 so that the catch flange terminal 128a engages in the groove 131 and thereby holds the bolt against rotation. The arrangement is such, of course, that this interengagement is effected only during the latching condition of the mechanism.

In order to release the latching mechanism 102 from latching condition, the wrench 122 is applied to the nut 119 and forced inwardly against the portion of the catch flange arm 128 which projects in exposed relation above the nut 119 with sufficient pressure to overcome the spring action of the rubber bushing 125. Thereby the latter is compressed and the catch member 124 pushed inwardly until the catch flange terminal 128a leaves the groove 131 and clears the nut 119, whereupon the bolt 112 can be turned to release the latch mechanism.

Means for maintaining the bolt 112 in the axial position when the wrench 122 is applied to the nut 119 comprises a retaining washer 132 which is of larger diameter than the aperture 129 and is mounted concentrically on the shaft of the bolt 112 interposed between the nut 119 and opposing outer face of the strut 108 within the inset 121. The washer has a segmental cutout 133 (Fig. 7) for clearing the catch flange terminal 128a, a keying offset tongue 134 being pressed integrally outwardly from the hub portion of the washer to effect a keying engagement within the lower portion of the groove 131 in the inner face of the nut so that the washer is held for rotation with the bolt 112. In this way the opposite sides of the clearance cutout 133 provide limit stops upon rotation of the bolt 112 through engagement with the respective opposite edges of the catch terminal flange 128a in the full latching and full unlatching positions of the mechanism. The washer 132 thus cooperates with the catch flange 128a to prevent overrunning of the mechanism in the actuation thereof by means of the wrench 122.

It will be understood that modifications and variations may be effected without departing from the scope of the novel concepts of the present invention.

I claim as my invention:

1. In a fender shield latching mechanism, a latch member, a support structure, rotary means carried by said support structure for actuating said latch member and including a wrench engageable head and a catch plate operatively supported by said support structure and including a body portion located substantially behind said wrench head and mounted generally normal to the axis of rotation of said head, with an angular flange extending outwardly in spaced relation laterally of said head and provided with a catch flange portion directed angularly toward and into locking engagement with the head, said catch flange portion having a part thereof laterally of the head and engageable by a wrench applied to the head for displacing the catch flange from the head when the head is to be turned by the wrench, said support structure including an abutment flange spaced substantially inwardly relative to said head, and a resilient biasing member engaging said abutment flange and bearing against the back of said catch body normally to bias the catch body toward said head.

2. In a fender shield structure including a panel having inner and outer sides and an apertured portion, a latching mechanism including a supporting structure mounted on the inner side of the fender shield, a bolt rotatably supported by said supporting structure and extending through said apertured portion with a wrench-engageable head thereon at the outer side of said panel, a latch member operatively connected to said bolt adjacent to said supporting structure and inside the panel, and a catch mounted between said supporting structure and said panel and having an arm projecting through an opening in said panel portion adjacent to said head, said arm being normally biased toward the inner face of said head but movable away from said head, said inner head face having a recess, said catch arm having a portion that projects from an exposed position a substantial distance laterally of the head toward said head and provided with a detent terminal positioned behind the head and inset substantially relative to the exposed portion of the arm, said inset detent terminal being engageable in said recess, whereby when said head is engaged by a wrench and inward pressure is applied thereby against said exposed arm portion of the catch to overcome said bias of the catch said detent terminal will be displaced from said recess and the head can then be turned by the wrench.

3. A fender shield structure as defined in claim 2, wherein the catch includes a resilient body portion extending from said catch arm and attached in substantial spaced relation relative to said catch arm to said supporting structure and said resilient body portion affording the bias for said arm.

4. A fender shield structure as defined in claim 2, wherein said catch comprises a plate mounted upon said bolt and having said catch arm connected thereto by a loop portion, and the bias for said arm being provided by a resilient spring member carried by said bolt.

5. A fender shield structure as defined in claim 2, wherein said detent terminal is stopped in a position displaced from said recess in response to said wrench engagement by bearing against a stop portion of said supporting structure located inwardly in spaced relation to the bolt head.

6. A fender shield structure as defined in claim 2, wherein said supporting structure includes means coactive with the catch to retain the same against lateral displacement while freely permitting movement of the arm and detent terminal for engagement in and displacement from said recess.

7. A fender shield structure as defined in claim 2, wherein a stop structure is mounted inwardly adjacent said inner head face and is movable rotatably with said bolt, with spaced stops engageable with said detent terminal when the latter is displaced from said recess by a wrench, whereby said stops are operable in cooperation with said detent terminal to limit the range of rotary movement of the bolt.

References Cited in the file of this patent

UNITED STATES PATENTS

| | | |
|---|---|---|
| 573,800 | Swanson | Dec. 22, 1896 |
| 666,747 | Fordyce | Jan. 29, 1901 |
| 829,407 | Long | Aug. 28, 1906 |
| 1,139,819 | Smith | May 18, 1915 |
| 1,182,310 | Plopper | May 9, 1916 |
| 1,894,631 | Owen | Jan. 17, 1933 |
| 2,068,732 | Cadwallader | Jan. 26, 1937 |
| 2,215,619 | Patrick et al. | Sept. 24, 1940 |
| 2,248,750 | Fergueson | July 8, 1941 |
| 2,314,651 | Claude-Mantle | Mar. 23, 1943 |
| 2,359,555 | Herreshoff | Oct. 3, 1944 |
| 2,569,496 | Schatzman | Oct. 2, 1951 |